(12) United States Patent
Olofsson et al.

(10) Patent No.: US 6,682,254 B1
(45) Date of Patent: Jan. 27, 2004

(54) GUIDING MEANS AT A JOINT

(75) Inventors: Ola Olofsson, Trelleborg (SE); Ulf Palmblad, Lund (SE); Leif Johansen, Oslo (NO)

(73) Assignee: Pergo (Europe) AB, Trelleborg (SE)

( * ) Notice: Subject to any disclaimer, the term of this patent is extended or adjusted under 35 U.S.C. 154(b) by 12 days.

(21) Appl. No.: 09/661,627

(22) Filed: Sep. 13, 2000

Related U.S. Application Data

(63) Continuation-in-part of application No. 09/601,573, filed as application No. PCT/SE99/00128 on Feb. 1, 1999.

(30) Foreign Application Priority Data

Feb. 4, 1998 (SE) .............................................. 9800311

(51) Int. Cl.$^7$ ................................................. E04B 1/38
(52) U.S. Cl. ...................... 403/375; 403/381; 403/345; 52/588.1; 52/582.1; 52/592.4
(58) Field of Search ............................. 52/582.1, 586.1, 52/591.1, 591.3, 591.4, 592.1, 592.2, 588.1

(56) References Cited

U.S. PATENT DOCUMENTS

| | | | |
|---|---|---|---|
| 752,694 A | | 2/1904 | Lund |
| 5,165,816 A | | 11/1992 | Parasin |
| 5,618,602 A | * | 4/1997 | Nelson .................. 52/591.1 X |
| 5,797,237 A | * | 8/1998 | Finkell, Jr. ................. 52/586.1 |
| 6,006,486 A | * | 12/1999 | Moriau et al. ............. 52/586.1 |
| 6,098,365 A | * | 8/2000 | Martin et al. ............... 403/334 |
| 6,101,778 A | * | 8/2000 | Martensson ................ 52/582.1 |
| 6,182,413 B1 | * | 2/2001 | Magnusson ................ 52/309.8 |
| 6,247,285 B1 | * | 6/2001 | Moebus ....................... 403/381 |
| 2001/0034992 A1 | * | 11/2001 | Pletzer et al. ................. 52/581 |

FOREIGN PATENT DOCUMENTS

| | | | | |
|---|---|---|---|---|
| DE | 3319235 A1 | * | 11/1984 | ............ E04B/1/60 |
| WO | 9627721 | | 9/1996 | |

* cited by examiner

*Primary Examiner*—John R. Cottingham
*Assistant Examiner*—Ryan M. Flandro
(74) *Attorney, Agent, or Firm*—Stevens, Davis, Miller & Mosher, L.L.P.

(57) ABSTRACT

A guiding means at a joint between boards, the joint comprising groove and tongue preferably intended to be joined by means of glue. The tongue includes at least one guiding wedge. A fitting clearance between the tongue and the groove includes a first fitting clearance and a second, guiding, fitting clearance. The second, guiding, fitting clearance is obtained through the guiding wedges which are arranged parallel to the extension of the joint. The first fitting clearance comprises the main part of the fit and the second, guiding fitting clearance comprises a smaller part of the fit. The first fitting clearance is in the range 0.1–1 mm, while the second, guiding, fitting clearance is in the range 0.01–0.2 mm. The tongue of the joint is provided with at least one equalizing recess so that at least one equalizing cavity is formed in the joint, which equalizing cavity receives surplus glue used during the joining.

14 Claims, 3 Drawing Sheets

GUIDING MEANS AT A JOINT

CROSS REFERENCE TO RELATED APPLICATIONS

This application is a continuation-in-part of application Ser. No. 09/601,573, filed Aug. 4, 2000; which is a 35 USC §371 application of International Application PCT/SE99/00128, filed Feb. 01, 1999.

BACKGROUND OF THE INVENTION

1. Field of the Invention

Prefabricated floorboards which at their edges are provided with groove and tongue are well known nowadays. As these are very easy to install it is possible for the normal handy man to achieve this. These type of floors can be constituted of massive wood, fibre board or particle board. These are often provided with a surface layer, such as lacquer or some sort of laminate. The boards are most often installed by gluing them together, via their groove and tongue. It is desired to join the separate boards so closely that the joint becomes practically invisible, which increases the moisture resistance radically. The usable life of the installed floor is hereby also increased. In order to achieve a tight joint, it is essential that glue is used excessively. The clearance in the joint will therefore have to be relatively large in order to be able to force the boards together without having to use special equipment due to the forces that would be needed otherwise. A small clearance will cause a hydraulic resistance caused by the glue captured inside the groove during the joining. The clearance needed will, therefore, cause a random discrepancy in the levels between adjacent floorboards. This discrepancy in levels will lead to an increased wear at the joint and that moisture may penetrate the joint. The decorative wear layer, often constituted by lacquer or laminate will hereby often be worn down closest to the joint. The wood fibre will, hereby, be naked closest to the joint, which, in addition to being unsightly, also may cause the fibres to swell when exposed to moisture. This causes the surface layer to rise closest to the edges whereby these edges will be exposed to further wear, which will decrease the useful life of the floor radically.

2. Description of the Related Art

It has, through the present invention, quite unexpectedly been possible to solve the above mentioned problems so that the risk for error during installation is radically reduced, whereby the average usable life of the floor, with a guiding means according to the present invention, is considerably increased. Accordingly, the invention relates to a guiding means at a joint between boards. The joint comprises groove and tongue preferably intended to be joined by means of glue. The tongue includes at least one guiding wedge whereby a fitting clearance between the tongue and the groove includes a first fitting clearance and a second, guiding, fitting clearance. The second, guiding fitting clearance is obtained through the guiding wedges which are arranged parallel to the extension of the joint, whereby the first fitting clearance comprises the main part of the fit and the second, guiding fitting clearance is in the range 0.1–1 mm, while the second, guiding fitting clearance is in the range 0.01–0.2 mm. The tongue of the joint is provided with at least one equalizing recess so that at least one equalizing cavity is formed in the joint, which equalizing cavity receives surplus glue used during the joining. The first fitting clearance is preferably in the range 0.1–0.5 mm, while the second, guiding fitting clearance is in the range 0.2–0.1 mm.

SUMMARY OF THE INVENTION

The cross section area of the equalising cavity is preferably at least 50% of the difference in cross section area between the tongue and the groove.

The guiding wedges are according to one alternative embodiment provided with a number of narrow channels arranged perpendicular to the extension of the joint. The distance between the channels preferably is less than 50 mm, most preferably less than 20 mm, while the width of the channels is at least 1 mm.

It is also advantageous to provide the tongue with a number of vents in the form of holes connecting the equalising cavity to the lower side of the tongue. The holes may alternatively connect the equalising cavity to the lower portions of the joint. According to yet another alternative the holes connects the equalising cavity to the lower side of the board.

The guiding means according to the embodiments of the invention forms a part of floor boards which together form a floor. The core of the boards is constituted by a material selected from the group, a fibre board, a particle board and that at least the upper side of the board is constituted by a decorative thermosetting laminate

BRIEF DESCRIPTION OF THE DRAWINGS

The invention is further illustrated together with enclosed figures showing different embodiments of the invention whereby.

DETAILED DESCRIPTION OF THE PREFERRED EMBODIMENTS

Figure 1:
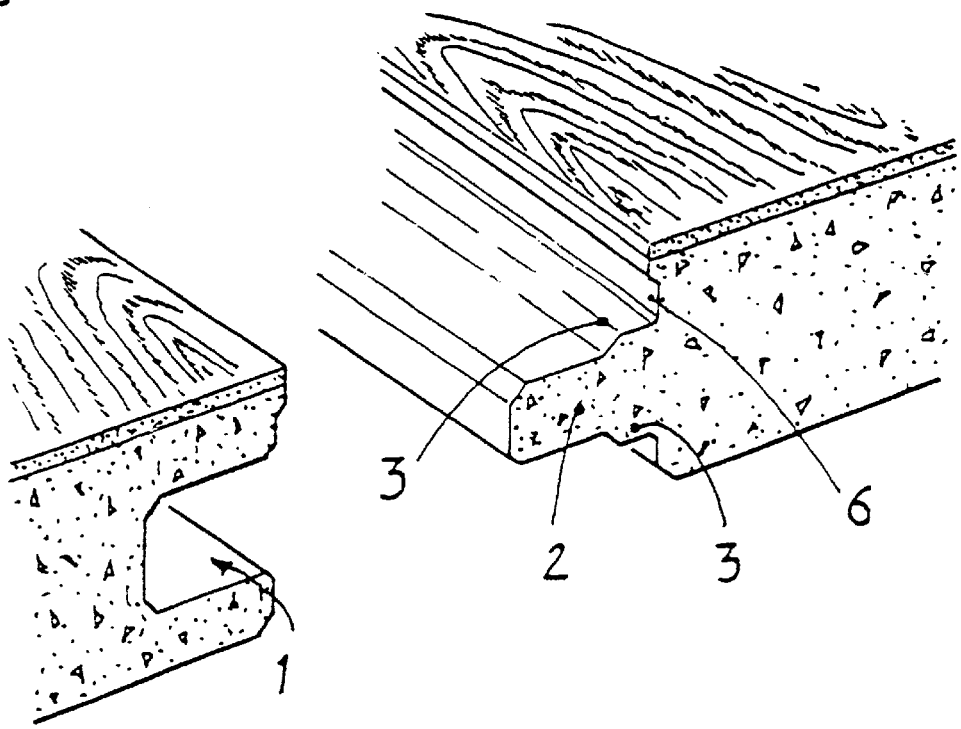
FIG. 1 shows, in perspective view, a first embodiment of a guiding means at a joint, according to the invention.
Figure 2:
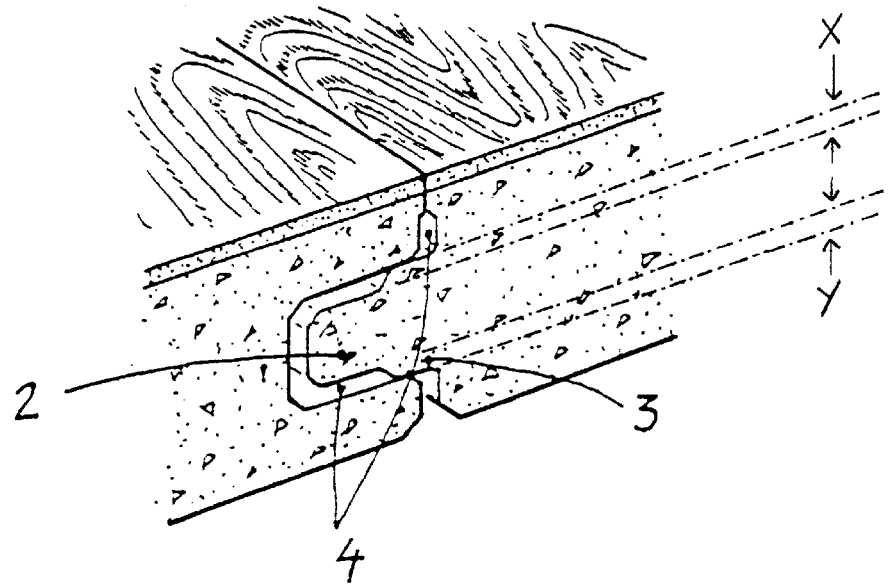
FIG. 2 shows, in perspective view, the embodiment form FIG. 1 after assembly.

Accordingly, FIG. 1 shows, in perspective view seen from above, a first embodiment of a guiding means at a joint according to the invention. The guiding means comprises groove 1 and tongue 2 which is intended to be joined by using glue. The tongue 2 comprises guiding wedges 3 on the upper and lower sides. The fitting clearance between the groove 1 and tongue 2 includes a first and a second, guiding, fitting clearance, which second, guiding, fitting clearance (x) is obtained by the guiding wedges 3. The first fitting clearance (y) forms the main part of the fit while the second, guiding, fitting clearance (x) forms a smaller part of the fit. The first fitting clearance (y) is approximately 0.2 mm while the second, guiding fitting clearance (x) is approximately 0.05 mm. The guiding wedges 3 are arranged parallel to the extension of the joint. The same embodiment is shown assembled in FIG. 2. The respective surfaces of the joint are provided with recesses 6 (see, e.g., FIG. 6) so that equalizing cavities 4 are formed in the joint. The equalizing cavities 4 are intended to, receive the glue used at assembly. The guiding means comprises a part of boards, intended to, together, form a floor whereby the core of the board is constituted by fibre board or a particle board and at least the upper side of the board is constituted by a decorative thermosetting laminate.

Figure 3:
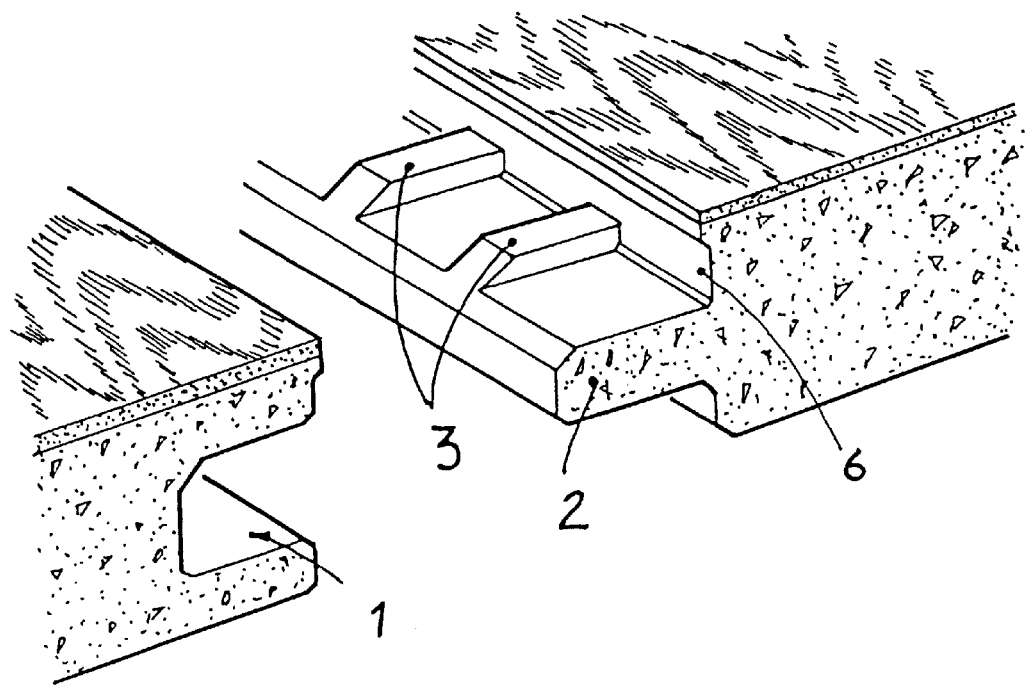
FIG. 3 shows, in perspective view, a second embodiment of a guiding means at a joint, according to the invention.

FIG. 3 shows, in perspective view seen aslant from above, a second embodiment of a guiding means at a joint, according to the invention. The embodiment conforms in the main with the one described in connection to FIGS. 1 and 2. The guiding wedges 3 are however, provided with narrow channels 5 arranged perpendicularly to the extension of the joint. The narrow channels 5, will allow the glue to flow from the groove 1, where the glue normally is applied, to the equalising cavity 4.

Figure 4:
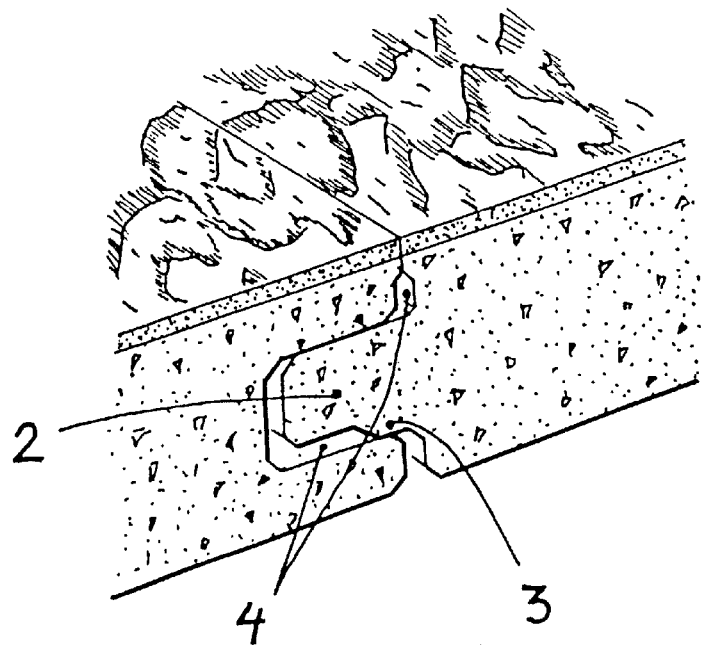
FIG. 4 shows, in perspective view, a third embodiment of a guiding means at a joint, according to the invention.

FIG. 4 shows, in perspective view seen aslant from above, a third embodiment of a guiding means at a joint, according to the invention. The embodiment is shown assembled. The embodiment corresponds in the main to the one described in connection to FIGS. 1 and 2, the tongue 2 is however provided with guiding wedges 3 only on the lower side.

Figure 5:
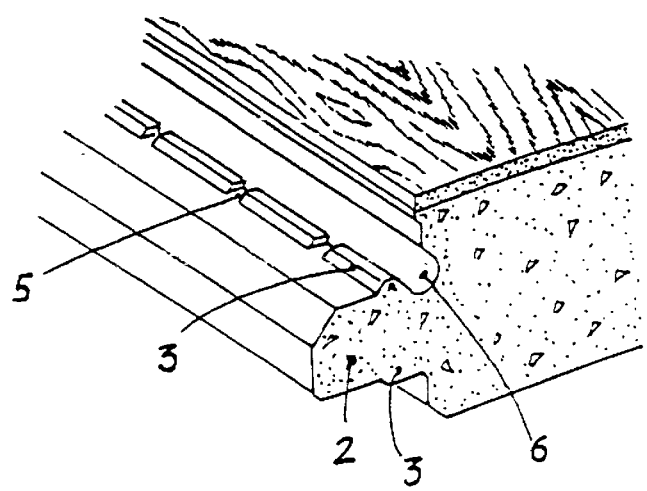
FIG. 5 shows, in perspective view, a fourth embodiment of a guiding means at a joint, according to the invention.

FIG. 5 shows, in perspective view seen aslant from above, a fourth embodiment of a guiding means at a joint, according to the invention. The embodiment corresponds in the main to the one described in connection to FIGS. 1, 2 and 3, the base of the tongue 2 is however provided with a recess 6 having an opening directed upwards and outwards whereby the surplus glue collected in the main cavity during assembly will have the function of a gasket in the joint.

Figure 6:
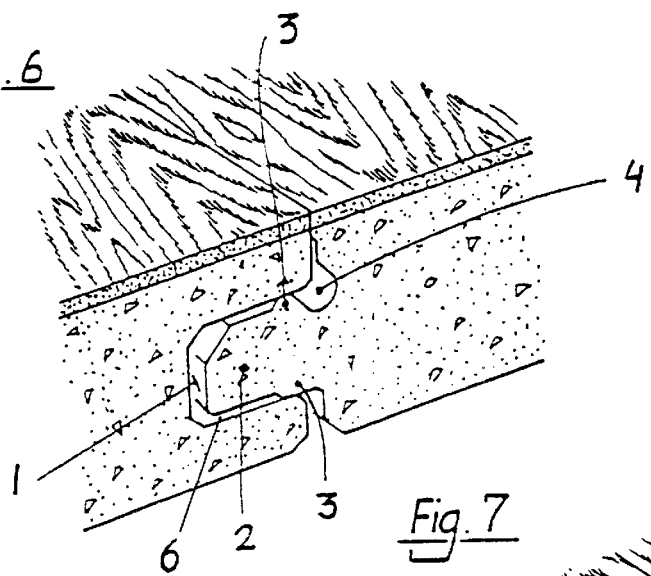
FIG. 6 shows, in perspective view, a preferred embodiment of a guiding means at a joint, according to the invention.

FIG. 6 shows, in perspective view seen aslant from above, a preferred embodiment of a guiding means at a joint, according to the invention. The embodiment is shown assembled. The embodiment corresponds in the main to the one described in connection to FIGS. 1 and 2, the base of the tongue 2 is however provided with a recess 6 having an opening directed upwards and outwards whereby the surplus glue collected in the equalising cavity during assembly will have the function of a gasket in the joint. The recess 6 will further provide a considerable reduction of the hydraulic pressure, caused by the glue in the equalising cavity during assembly, as it will be directed upwards. The force, caused by the hydraulic pressure, will normally urge the joint apart during the assembly, before the glue has set.

Figure 7:
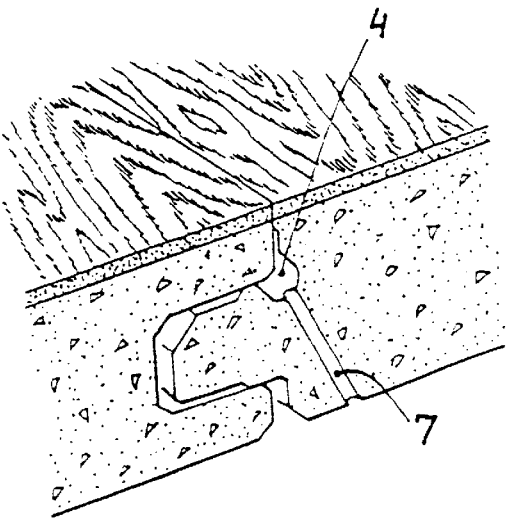
FIG. 7 shows, in perspective view, an alternative embodiment of a guiding means at a joint, as shown in FIG. 6.
Figure 8:
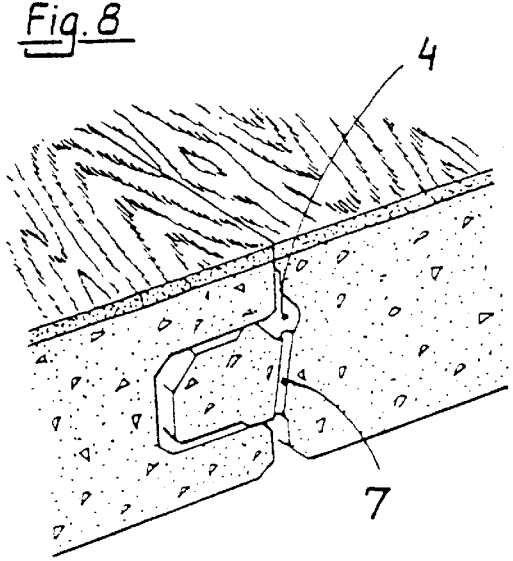
FIG. 8 shows, in perspective view, an alternative embodiment of a guiding means at a joint, as shown in FIG. 6.

FIGS. 7 and 8 show, in perspective view seen aslant from above, an alternative embodiments of a guiding means at a joint, according to the invention. FIGS. 7 and 8 corresponds in the one described in connection to FIG. 6. The equalising cavity 4 is, however, provided with vents 7 in the form of holes. The vents 7 will slowly release the hydraulic pressure of the glue in the equalising cavity during assembly. The slow pressure release will allow the glue to be forced into the narrow upper part of the equalising cavity 4 at the initial stage of the joining. The glue can be applied in the groove 1, the equalising cavity 4 or both.

The invention is not limited by the embodiments shown since these can varied in different ways within the scope of the invention. Guiding wedges 3 can, for example, be arranged inside the groove 1. If these guiding wedges 3 are parallel to the extension of the joint, they are suitably arranged in the bottom of the groove 1 while they can be given a shape similar to the one shown in FIG. 3 if they are arranged perpendicularly to extension of the joint.

What is claimed is:

1. A guiding means at a joint between boards, the joint comprising groove and tongue intended to be joined by means of glue wherein the tongue includes at least one guiding wedge whereby a fitting clearance between the tongue and the groove includes a first fitting clearance and a second, guiding, fitting clearance, which second, guiding, fitting clearance is obtained through the guiding wedges which are arranged parallel to the extension of the joint, whereby the first fitting clearance comprises a main part of a fit between the boards and the second, guiding fitting clearance comprises a smaller part of the fit, that the first fitting clearance is in the range 0.1–1 mm, while the second, guiding, fitting clearance is in the range 0.01–0.2 mm and that the tongue of the joint is provided with at least one equalizing recess so that at least one equalizing cavity is formed in the joint, which equalizing cavity receives surplus glue used during the joining, wherein the equalizing cavity is formed at an upper side base of the tongue through said at least one equalizing recess, said at least one equalizing recess having an opening directed upwards and outwards whereby a considerable part of the hydraulic pressure, caused by the glue in the equalizing cavity during assembly will be directed upwards whereby the force, caused by the hydraulic pressure, urging the joint apart during the assembly is radically reduced and the cross section area of the equalizing cavity is at least 50% of the difference in cross section area between the tongue and the groove.

2. The guiding means according to claim 1 wherein the first fitting clearance is in the range 0.1–0.5 mm, while the second, guiding, fitting clearance is in the range 0.02–0.1 mm.

3. The guiding means according to claim 2 wherein the guiding means forms a part of floor boards which together form a floor, whereby a core of the boards is constituted by a material selected from the group consisting of a fibre board and a particle board and that at least an upper side of the board is constituted by a decorative thermosetting laminate.

4. The guiding means according to claim 1 wherein the equalizing cavity is arranged at an upper side base of the tongue through one of said at least one equalizing recess, the one of said at least one equalizing recess having an opening directed upwards and outwards whereby the surplus glue collected in the equalizing cavity during assembly will have the function of a gasket in the joint.

5. The guiding means according to claim 3 wherein the guiding means forms a part of floor boards which together form a floor, whereby a core of the boards is constituted by a material selected from the group consisting of a fibre board and a particle board and that at least an upper side of the board is constituted by a decorative thermosetting laminate.

6. The guiding means according to claim 1 wherein the guiding means forms a part of floor boards which together form a floor, whereby a core of the boards is constituted by a material selected from the group consisting of a fibre board and a particle board and that at least an upper side of the board is constituted by a decorative thermosetting laminate.

7. A guiding means at a joint between boards, the joint comprising groove and tongue intended to be joined by means of glue wherein the tongue includes at least one guiding wedge whereby a fitting clearance between the tongue and the groove includes a first fitting clearance and a second, guiding, fitting clearance, which second, guiding, fitting clearance is obtained through the guiding wedges which are arranged parallel to the extension of the joint, whereby the first fitting clearance comprises a main part of a fit between the boards and the second, guiding fitting clearance comprises a smaller part of the fit, that the first fitting clearance is in the range 0.1–1 mm, while the second, guiding, fitting clearance is in the range 0.01–0.2 mm and that the tongue of the joint is provided with at least one equalizing recess so that at least one equalizing cavity is formed in the joint, which equalizing cavity receives surplus glue used during the joining, wherein the guiding wedges, are provided with a number of narrow channels arranged perpendicular to the extension of the joint.

8. The guiding means according to claim 7 wherein the distance between the channels is less than 50 mm.

9. The guiding means according to claim 8 wherein the width of the channels is at least 1 mm.

10. The guiding means according to claim 7 wherein the distance between the channels is less than 20 mm.

11. The guiding means according to claim 7 wherein the width of the channels is at least 1 mm.

12. A guiding means at a joint between boards, the joint comprising groove and tongue intended to be joined by means of glue wherein the tongue includes at least one guiding wedge whereby a fitting clearance between the tongue and the groove includes a first fitting clearance and a second, guiding, fitting clearance, which second, guiding, fitting clearance is obtained through the guiding wedges which are arranged parallel to the extension of the joint, whereby the first fitting clearance comprises a main part of a fit between the boards and the second, guiding fitting clearance comprises a smaller part of the fit, that the first fitting clearance is in the range 0.1–1 mm, while the second, guiding, fitting clearance is in the range 0.01–0.2 mm and that the tongue of the joint is provided with at least one equalizing recess so that at least one equalizing cavity is formed in the joint, which equalizing cavity receives surplus glue used during the joining, wherein the equalizing cavity is formed at an upper side base of the tongue through said at least one equalizing recess, said at least one equalizing recess having an opening directed upwards and outwards whereby a considerable part of the hydraulic pressure, caused by the glue in the equalizing cavity during assembly will be directed upwards whereby the force, caused by the hydraulic pressure, urging the joint apart during the assembly is radically reduced and the tongue is provided with a number of vents in the form of holes connecting the equalizing cavity to a lower side of the tongue.

13. A guiding means at a joint between boards, the joint comprising groove and tongue intended to be joined by means of glue wherein the tongue includes at least one guiding wedge whereby a fitting clearance between the tongue and the groove includes a first fitting clearance and a second, guiding, fitting clearance, which second, guiding, fitting clearance is obtained through the guiding wedges which are arranged parallel to the extension of the joint, whereby the first fitting clearance comprises a main part of a fit between the boards and the second, guiding fitting clearance comprises a smaller part of the fit, that the first fitting clearance is in the range 0.1–1 mm, while the second, guiding, fitting clearance is in the range 0.01–0.2 mm and that the tongue of the joint is provided with at least one equalizing recess so that at least one equalizing cavity is formed in the joint, which equalizing cavity receives surplus glue used during the joining, wherein the equalizing cavity is formed at an upper side base of the tongs through said at least one equalizing recess, said at least one equalizing recess having an opening directed upwards and outwards whereby a considerable part of the hydraulic pressure, caused by the glue in the equalizing cavity during assembly will be directed upwards whereby the force, caused by the hydraulic pressure, urging the joint apart during the assembly is radically reduced and the tongue is provided with a number of vents in the form of holes connecting the equalizing cavity to the lower portions of the joint.

14. A guiding means at a joint between boards, the joint comprising groove and tongue intended to be joined by means of glue wherein the tongue includes at least one guiding wedge whereby a fitting clearance between the tongue and the groove includes a first fitting clearance and a second, guiding, fitting clearance, which second, guiding, fitting clearance is obtained through the guiding wedges which are arranged parallel to the extension of the joint, whereby the first fitting clearance comprises a main part of a fit between the boards and the second, guiding fitting clearance comprises a smaller part of the fit, that the first fitting clearance is in the range 0.1–1 mm, while the second, guiding, fitting clearance is in the range 0.01–0.2 mm and that the tongue of the joint is provided with at least one equalizing recess so that at least one equalizing cavity is formed in the joint, which equalizing cavity receives surplus glue used during the joining, wherein the equalizing cavity is formed at an upper side base of the tongue through said at least one equalizing recess, said at least one equalizing recess having an opening directed upwards and outwards whereby a considerable part of the hydraulic pressure, caused by the glue in the equalizing cavity during assembly will be directed upwards whereby the force, caused by the hydraulic pressure, urging the joint apart during the assembly is radically reduced and the tongue is provided with a number of vents in the form of holes connecting the equalizing cavity to a lower side of the board.

\* \* \* \* \*